(12) United States Patent
Sun et al.

(10) Patent No.: US 9,686,816 B2
(45) Date of Patent: Jun. 20, 2017

(54) PAUSE SIGNALS FOR FULL-DUPLEX WIRELESS NETWORKS

(71) Applicant: Huawei Technologies Co., Ltd., Shenzhen (CN)

(72) Inventors: Sheng Sun, Kanata (CA); Petar Djukic, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 184 days.

(21) Appl. No.: 14/337,886

(22) Filed: Jul. 22, 2014

(65) Prior Publication Data

US 2016/0029432 A1 Jan. 28, 2016

(51) Int. Cl.
| | |
|---|---|
| *H04L 1/00* | (2006.01) |
| *H04W 76/04* | (2009.01) |
| *H04L 5/14* | (2006.01) |
| *H04L 29/06* | (2006.01) |
| *H04W 72/04* | (2009.01) |
| *H04L 1/18* | (2006.01) |
| *H04W 28/06* | (2009.01) |

(52) U.S. Cl.
CPC ............ *H04W 76/048* (2013.01); *H04L 1/00* (2013.01); *H04L 1/004* (2013.01); *H04L 1/1887* (2013.01); *H04L 5/14* (2013.01); *H04L 69/22* (2013.01); *H04W 72/0446* (2013.01); *H04L 2001/0093* (2013.01); *H04W 28/06* (2013.01)

(58) Field of Classification Search
CPC ........... H04W 76/048; H04W 72/0446; H04W 28/06; H04L 1/00; H04L 5/14; H04L 1/004; H04L 1/1887; H04L 69/22
See application file for complete search history.

(56) References Cited

U.S. PATENT DOCUMENTS

| | | | | |
|---|---|---|---|---|
| 2002/0165004 A1* | 11/2002 | Chen | ..................... | H04L 1/0051 455/522 |
| 2003/0050066 A1* | 3/2003 | Tobe | ..................... | H04W 36/22 455/446 |

(Continued)

FOREIGN PATENT DOCUMENTS

| | | |
|---|---|---|
| CN | 103023593 A | 4/2013 |
| CN | 103155521 A | 6/2013 |
| EP | 2557889 A1 | 2/2013 |

*Primary Examiner* — Abdelnabi O Musa
(74) *Attorney, Agent, or Firm* — Slater Matsil, LLP

(57) ABSTRACT

System and method embodiments are provided for pausing data transmission in a full-duplex wireless network. Embodiments eliminate the deadlocks in the full duplex MAC layer and improve the system efficiency. In an embodiment, a method in a wirelessly enabled and full duplex enabled network component for pausing an ongoing data transmission includes beginning a transmission, with the network component, of first data to a first station; determining, with the network component, that transmission of a second data to a second station is required before completion of the transmission of the first data to the first station; transmitting, with the network component, a pause indicator to the first station notifying the first station that transmission of the first data will be paused; transmitting, with the network component, the second data to the second station; and resuming transmitting, with the network component, the first data to the first station.

36 Claims, 7 Drawing Sheets

(56) References Cited

U.S. PATENT DOCUMENTS

| | | | |
|---|---|---|---|
| 2008/0291853 A1* | 11/2008 | Wiatrowski | H04W 76/066 370/310 |
| 2009/0201816 A1* | 8/2009 | Takahashi | H04L 5/14 370/235 |
| 2010/0118785 A1 | 5/2010 | Sugaya | |
| 2011/0305217 A1* | 12/2011 | Seok | H04L 47/10 370/329 |
| 2012/0087634 A1 | 4/2012 | Lalwaney | |
| 2012/0287829 A1* | 11/2012 | Chang | H04L 5/16 370/296 |
| 2015/0223245 A1* | 8/2015 | Cheng | H04L 5/00 370/329 |

\* cited by examiner

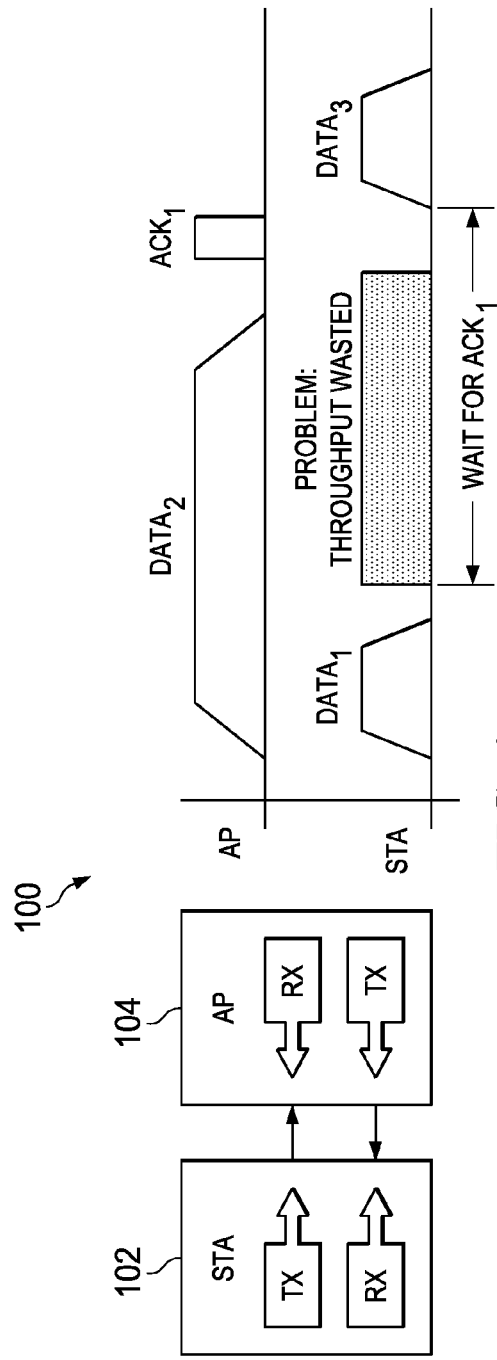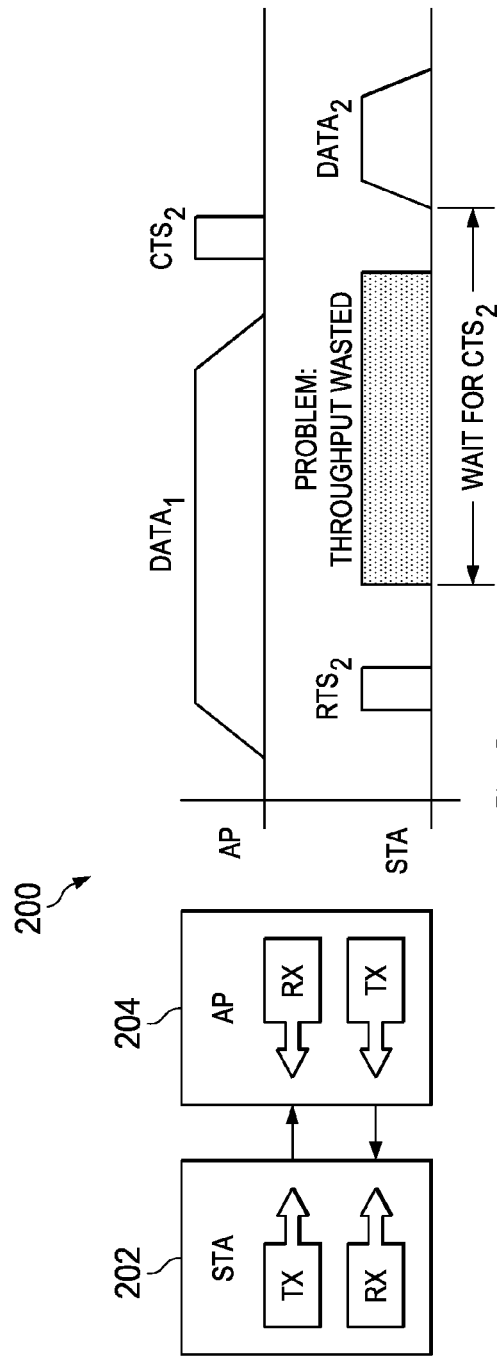

US 9,686,816 B2

PAUSE SIGNALS FOR FULL-DUPLEX WIRELESS NETWORKS

TECHNICAL FIELD

The present invention relates to a system and method for wireless communication systems, and, in particular embodiments, to a system and method for full-duplex operation of a wireless communication system.

BACKGROUND

Full-duplex operation is a promising way to increase throughput in wireless systems. In a full-duplex operation, a wireless network element is capable of transmitting and receiving data simultaneously. In the media access control (MAC) layer, full-duplex operation can be used to increase the efficiency of random access. However, if the links are asymmetrical, this efficiency may be lost due to transmitter-receiver deadlocks in the MAC layer. Links may be said to be asymmetrical if connectivity from node a to node b may differ significantly from that of from node b back to node a. For example, the amount of data transmitted in one direction, and consequently the time to deliver the data in that direction may be significantly more than the amount of data transmitted in the other direction and the time to deliver that data in the other direction.

MAC layer interactions often involve two-way communications between MAC peers. These interactions are used to ensure the protocol operates correctly (e.g., datagrams are not lost). Typically, timing restrictions are put on interactions to enable higher efficiency and eliminate errors due to channel (e.g., timeouts are used instead of negative acknowledgements (ACKs), or to detect lost frames from the interaction initiator). However, some MAC peers (e.g., wireless access points (APs)) communicate with more than one other MAC peer. Consequently, if full-duplex hardware is used, MAC layer restrictions may block the wireless system from fully taking advantage of the efficiencies provided by full-duplex operation.

FIG. 1 is a diagram of a wireless system 100 illustrating an example of full-duplex MAC layer deadlock. In this example, the station (STA) 102 is transmitting $DATA_1$ to the AP 104. At the same time, the AP 104 is also transmitting $DATA_2$ to another STA (not shown). The $DATA_2$ transmission occupies the medium for a longer period of time than the $DATA_1$ transmission. STA 102 has to wait for the acknowledgement ($ACK_1$) message from the AP 104 before sending its next frame ($DATA_3$). However, there may be a significant time between when the STA 102 finishes transmitting $DATA_1$ and the time at which the AP 104 can transmit the $ACK_1$ to STA 102 due to the AP 104 waiting to complete transmission of $DATA_2$ to the other STA before sending the $ACK_1$ to STA 102. The time period in which the STA 102 has to wait for the $ACK_1$ from the AP 104 is wasted throughput.

FIG. 2 is a diagram of another wireless system 200 illustrating another example full-duplex MAC layer deadlock. In this example, the STA 202 sends an $RTS_2$ (request) to the AP 204. However, at the same time that the AP 202 is receiving the $RTS_2$ from the STA 202, the AP 204 is sending $DATA_1$ to another STA (not shown). The STA 102 has to wait until the ongoing transmission $DATA_1$ from the AP 204 to the other STA (not shown) is completed before it can receive the $CTS_2$ (grant) from the AP 204. Again, throughput is wasted idling the channel waiting for the AP 204 to transmit the $CTS_2$ to the STA 202. Thus, fairness may be lost if the other STA has longer transmission.

Thus, to make more efficient use of channel resources in full-duplex mode for MAC layer transmissions, a new MAC strategy is desirable.

SUMMARY

In accordance with an embodiment, a method in a wirelessly enabled and full duplex enabled network component for pausing an ongoing data transmission includes beginning transmission, with the network component, of first data to a first station; determining, with the network component, that transmission of a second data to a second station is required before completion of the transmission of the first data to the first station; transmitting, with the network component, a pause indicator to the first station notifying the first station that transmission of the first data will be paused; transmitting, with the network component, the second data to the second station; and resuming transmitting, with the network component, the first data to the first station.

In accordance with an embodiment, a wirelessly enabled and full duplex enabled network component for pausing an ongoing data transmission includes a processor and a computer readable storage medium storing programming for execution by the processor, the programming including instructions to: begin transmission of first data to a first station; determine that transmission of a second data to a second station is required before completion of the transmission of the first data to the first station; transmit a pause indicator to the first station notifying the first station that transmission of the first data will be paused; transmit the second data to the second station; and resuming transmitting, with the network component, the first data to the first station.

In accordance with an embodiment, a method in a wirelessly enabled network component for pausing reception of data, includes receiving, at a first network component, data from a second network component; receiving a pause indicator from the second network component, wherein the pause indicator notifies the first network component that data reception from the second network component will be suspended; suspending, with the first network component, a media access control (MAC) layer receiving procedure; setting, with the first network component, a pause timeout period; and resuming, with the first network component, the MAC layer receiving procedure upon the expiration of the pause timeout period.

In accordance with an embodiment, a wirelessly enabled network component configured to pause an ongoing data reception includes a processor and a computer readable storage medium storing programming for execution by the processor, the programming including instructions to: receive data from a wireless station; receive a pause indicator from the wireless station, wherein the pause indicator notifies the network component that data reception from the wireless station will be suspended; suspend a media access control (MAC) layer receiving procedure; set a pause timeout period; and resume the MAC layer receiving procedure upon the expiration of the pause timeout period.

BRIEF DESCRIPTION OF THE DRAWINGS

For a more complete understanding of the present invention, and the advantages thereof, reference is now made to the following descriptions taken in conjunction with the accompanying drawing, in which:

FIG. 1 is a diagram of a wireless system illustrating an example of full-duplex MAC layer deadlock;

FIG. 2 is a diagram of another wireless system illustrating another example full-duplex MAC layer deadlock;

DETAILED DESCRIPTION OF ILLUSTRATIVE EMBODIMENTS

Figure 3:
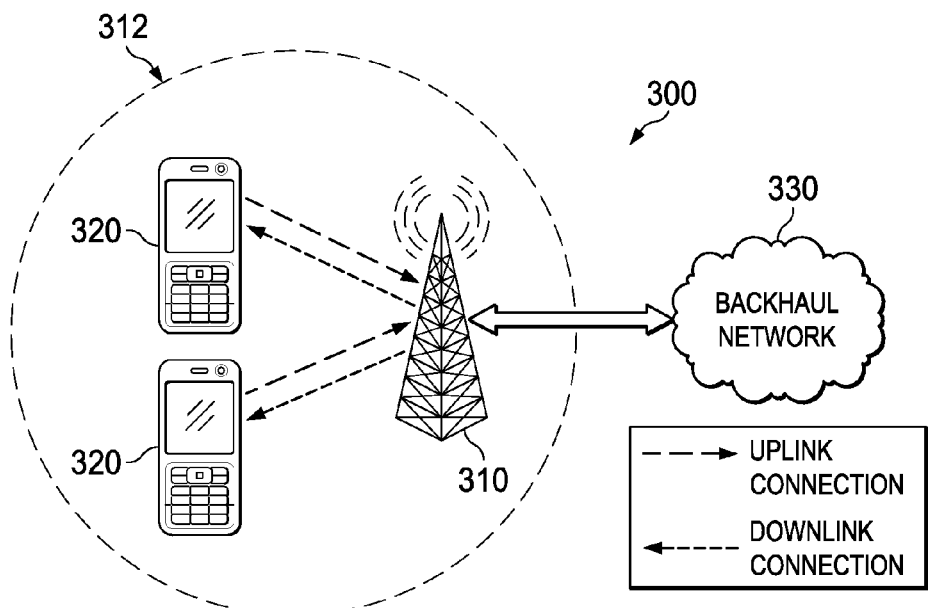
FIG. 3 illustrates an embodiment network for communicating data.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The essence of the MAC layer deadlock problem is that the transmitter is busy with a data transmission when it needs to perform another MAC procedure. There are at least two solutions to this problem. One solution is to delay the other MAC procedure. This requires flexibility in the MAC procedures to delay actions, which are not usually there since most MAC procedures have strict timing requirements on ACK messages. Additionally, this solution introduces a fairness problem—ongoing transmission is more important than past or future transmissions. A second solution is to interrupt the data transmission to perform the other MAC procedures. This second solution does not suffer from the problems of the first solution—i.e., does not require flexibility in the MAC procedures to delay actions and does not introduce fairness problems.

Disclosed herein are systems and methods for resolving MAC layer deadlocks in full-duplex wireless networks. In an embodiment, the transmitter interrupts the ongoing data transmission—the transmission is suspended so that the transmitter can transmit to other receivers. In an embodiment, interruption requires the notification of the first receiver of the ongoing data transmission. In an embodiment, the transmitting network element transmits a special signal or frame during the ongoing current transmission to notify its receiver that the ongoing transmission is about to be paused. This special frame is referred to as a PAUSE frame. While the transmission is paused, the receiver does not expect any data from the transmitter and the regular operation of the MAC layer is suspended. The receiver waits until transmission is resumed to decode the rest of the data. This eliminates deadlocks in the full-duplex MAC layer and improves the system efficiency. During this time, the transmitter performs other MAC procedures and transmits data to other receivers.

Various embodiments of this disclosure provide a number of benefits. For example, embodiments of the disclosure solve the transmitter and receiver transmission problem and fully utilize the full duplex capability of the transmitter. Without the benefit of pausing a long transmission to one station to, for example, acknowledge receipt of data from a different station, all transmission would take the time of the longest transmission. Since traffic has a high variance to mean (i.e., many short packets, few long packets), this is a solution to an enormous problem. Additionally, embodiments of the disclosure address the problem in any MAC layer procedure in a back compatible way. Without this, in order to solve the asymmetrical transmitter and receiver transmission problem in full duplex mode, it may be necessary to modify each MAC procedure to solve its own problems, but such a solution would require big changes in existing standards. Embodiments of the disclosure are applicable to future MAC layer standards using full-duplex over the same channel or with two logical channels (e.g., with OFDMA). Various embodiments of the disclosure are useful for both random access and scheduled access and can be used in current IEEE 802.11 standards. Embodiments of the disclosure enable mechanisms for new MAC layer procedures such as, for example, collision detection notification.

FIG. 3 illustrates a embodiment network 300 for communicating data. The network 300 comprises an access point (AP) 310 having a coverage area 312, a plurality of user equipment (UEs) 320, and a backhaul network 330. As used herein, the term AP may also be referred to as a transmission point (TP) and the two terms may be used interchangeably throughout this disclosure. As used herein the UEs 320 and the AP 310 may also be referred to as stations (STAs). The AP 310 may comprise any component capable of providing wireless access by, inter alia, establishing uplink (dashed line) and/or downlink (dotted line) connections with the UEs 320, such as a base station transceiver (BST), an enhanced base station (eNB), a femtocell, and other wirelessly enabled devices. The UEs 320 may comprise any component capable of establishing a wireless connection with the AP 310. Examples of UEs 320 include mobile phones, smart phones, laptop computers, and tablet computers. The backhaul network 330 may be any component or collection of components that allow data to be exchanged between the AP 310 and a remote end (not shown). In some embodiments, the network 300 may comprise various other wireless devices, such as relays, femtocells, etc.

The AP 310 is configured to operate in full-duplex mode. In an embodiment, one or more of the UEs is configured to operate in full-duplex mode. In an embodiment, communications between the UEs 320 and the AP 310 is accomplished according to MAC layer protocols. In an embodiment, the AP 310 and the UEs 320 may be Institute of Electrical and Electronics Engineers (IEEE) 802.11 compliant devices.

In an embodiment, the AP 310 is enabled to determine whether a current transmission to one UE 320 should be interrupted to perform another action (e.g., another MAC action) for a different UE 320. When a current transaction should be interrupted, the AP 310 is configured to transmit a pause signal or a pause frame to the UE 320 associated with the current transmission. The pause signal or frame alerts the UE 320 that its data transmission will be paused and, in an embodiment, indicates a time when the UE 320 should expect its data transmission to resume. Alternatively, the UE 320 may wait an indefinite period of time until it receives a transmission with a header indicating that its data transmission is resuming. During the pause duration, the AP 310 is configured to perform other transmissions of information to other UEs 320 and/or to perform other MAC layer procedures. For example, if the AP 310 receives data from a second UE 320 that requires and ACK message while the AP 310 is transmitting data to a second UE 320, the AP 310 may send a pause signal or pause frame to the second UE 320, pause the transmission to the second UE 320, send an ACK message to the first UE 320, and then resume transmission of data to the second UE 320. Thus, by receiving an ACK message shortly after completing its data transmission to the AP 310, the first UE 320 can continue to transmit data to the AP 310 without waiting for a long period of time for the AP 310 to finish sending data to the second UE 320. Thus, channel resources are more efficiently utilized.

In an embodiment, the pause frame is a control frame inserted between fragmented transmissions. Fragmentation may be necessary due to the length of the forward error correction (FEC) code. Fragmentation may also be necessary due to the header size restrictions. In an embodiment, a special sequence of additional data bits is inserted into a data transmission to notify a receiver that a control frame is coming rather than more transmission data bits.

In another embodiment, the pause signal is a set of bits inserted in the transmission which would not otherwise occur in the transmission. For example, a special frame containing a 32 bit of a bit string may be inserted in the transmission—e.g., 10101010101010011010101010101010. In an embodiment, the pause signal is a pseudo-noise (PN) physical layer (PHY) sequence transmitted over the ongoing transmission. In an embodiment, the pause frame contains a time duration of the pause.

In an embodiment, if the transmitter (e.g., AP 310) knows how long the short reception from a first STA (e.g., one of the UEs 32) will take, the transmitter is configured to send the pause signal or pause frame to the second STA receiving a data transmission before the short reception ends, thereby allowing the transmitter (e.g., AP 310) to immediately transmit, for example, an ACK message back to the first STA and then resume transmission to the second STA. Thus, the first STA will receive the ACK message sooner and will be able to resume its data transmission to the transmitter (e.g., AP 310) sooner thereby reducing the amount of time that the channel is idle even further.

Although described primarily with reference to an AP operating in full-duplex mode, the pause insertion capabilities and methods may be implemented in any STA that has full-duplex capability including, for example, any of UEs 320.

Figure 4:
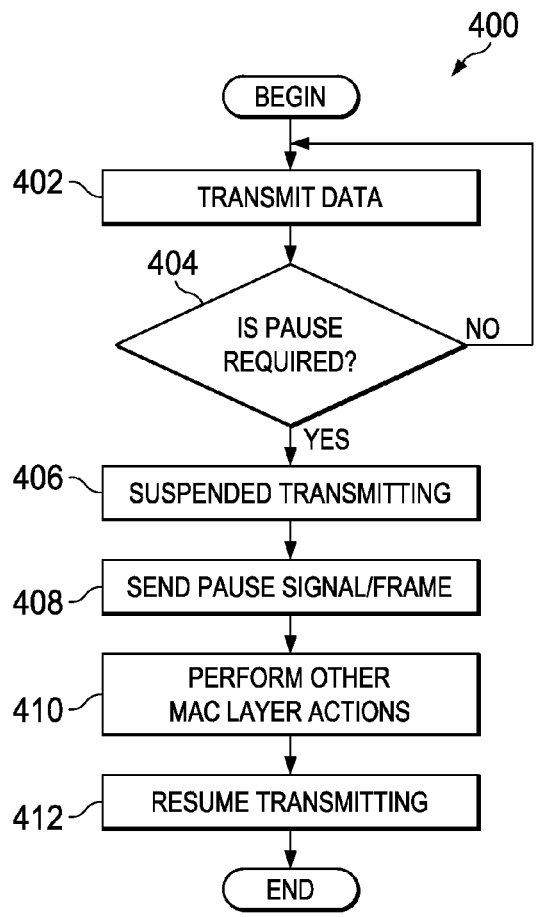
FIG. 4 is a flowchart illustrating an embodiment method in a transmitter for pausing transmission of data to a receiver.

FIG. 4 is a flowchart illustrating an embodiment method 400 in a transmitter for pausing transmission of data to a receiver. The method 400 begins at block 402 where the transmitter is transmitting data to a first receiver. At block 404, the transmitter determines whether a pause in data transmission to the first receiver is required. An example of a condition that would cause the transmitter to pause data transmission to the first receiver is receipt of data from a second receiver that requires the transmitter to send an ACK signal to the second receiver. If, at block 404, a pause is not required, the method 400 proceeds to block 402 where the transmitter continues transmitting the data to the first receiver. If, at block 404, a pause is required, the method 400 proceeds to block 406 where the transmitter suspends transmitting data to the first receiver. At block 408, the transmitter sends a pause signal/frame to the first receiver. At block 410, the transmitter performs other MAC layer actions that necessitated pausing the transmission to the first receiver. At block 412, after completing the other MAC layer actions, the transmitter resumes transmitting data to the first receiver until data transmission is complete or until another pause is required, after which, the method 400 may end.

Figure 5:
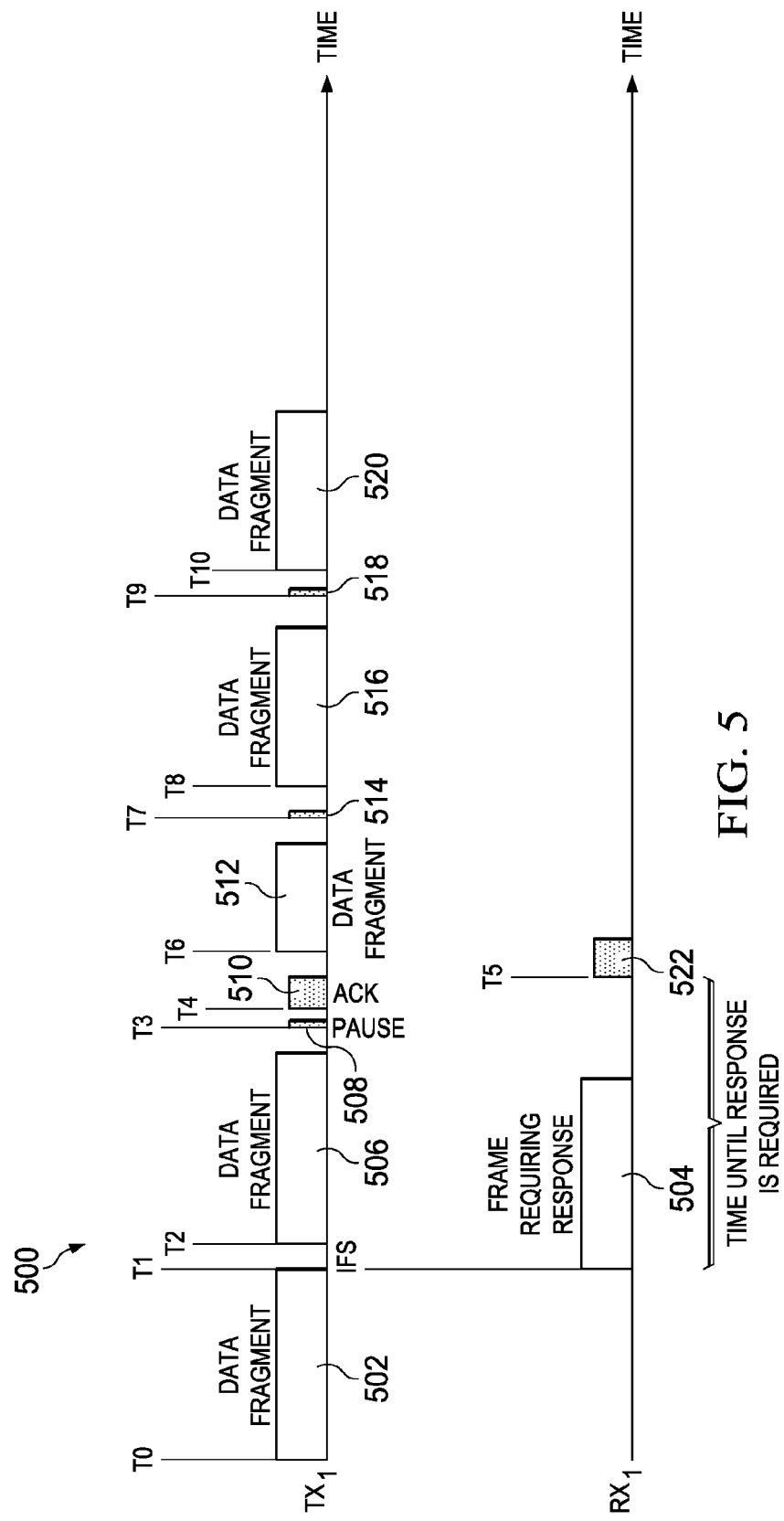
FIG. 5 is a block diagram of an embodiment method for pause insertion with block fragmentation.

FIG. 5 is a block diagram of an embodiment method 500 for pause insertion with block fragmentation. A network component, such as, for example, AP 310 or one of the UEs 320 in FIG. 3, is configured for full-duplex operation. At time T0, the transmitter (TX1) for the network component transmits a data fragment 502 to a first STA followed by an inter-frame spacing (IFS) time period that begins at time T1. Also, at time T1, the receiver (RX1) for the network component begins receiving data frame 504 from a second STA that requires a response. At time T2, the TX1 begins transmitting the next data fragment 506 to the first STA. Upon receiving a frame 504 that requires a response, the TX1 calculates when the response is required and truncates the next transmitted data block 512 to the first STA so that the response can take place in the time required for the response. At time T3, the TX1 transmits a pause frame 508 to the first STA to indicate that data transmission to the first STA will be paused for a short duration. At time T4, the TX1 transmits an ACK message 510 to the second STA. At time T5, the TX1 begins transmitting the truncated data fragment 512 to the first STA. At times T6 and Time T8, the TX1 sends a pause frame 514, 518. At times T7 and T9, the TX1 sends other data fragments 516, 520 to the first STA. In an embodiment, the first STA (the receiver of the original transmission) constantly scans the received frames to (1) check the length of the transmission and (2) check the frame type to see if the frame type is a pause frame.

Figure 6:
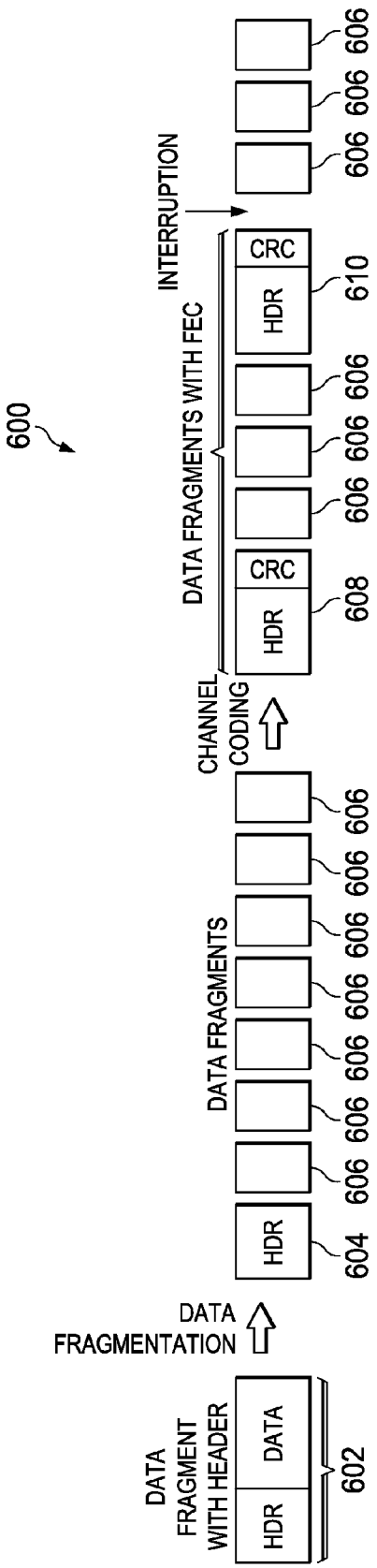
FIG. 6 is a block diagram illustrating an embodiment method for pause insertion with frame aggregation.

FIG. 6 is a block diagram illustrating an embodiment method 600 for pause insertion with frame aggregation. Block fragmentation needs long frames to make it efficient due to the gap required between transmissions. Since each block uses a single FEC code, this means that a long block cannot be arbitrarily interrupted without losing the entire frame. Using a lower rate code would introduce inefficiencies into the channel. In an embodiment, this problem is resolved with a smaller FEC size. A transmitter has data 602 to transmit to a STA. The data 602 includes a header (HDR) section and data (DATA) section. The transmitter separates the data 602 into a HDR package 604 and a plurality of smaller DATA fragment packages 606. Each package has its own FEC code. The HDR package 604 is appended with a CRC at the end of the HDR package 604 to produce a modified HDR package 608 that is transmitted to the STA. The remaining DATA fragment packages 606 are transmitted in order to the STA. If a DATA fragment package 610 is transmitted just before an interruption, a cyclic redundancy check (CRC) is appended at the end of that fragment package 610. The receiver of the original transmission checks each DATA fragment 606, 610 to see if the CRC passes. If the CRC passes and the number of bits is smaller than what is specified in the HDR package 608 of the transmission, the receiver determines that the transmission is interrupted.

Figure 7:
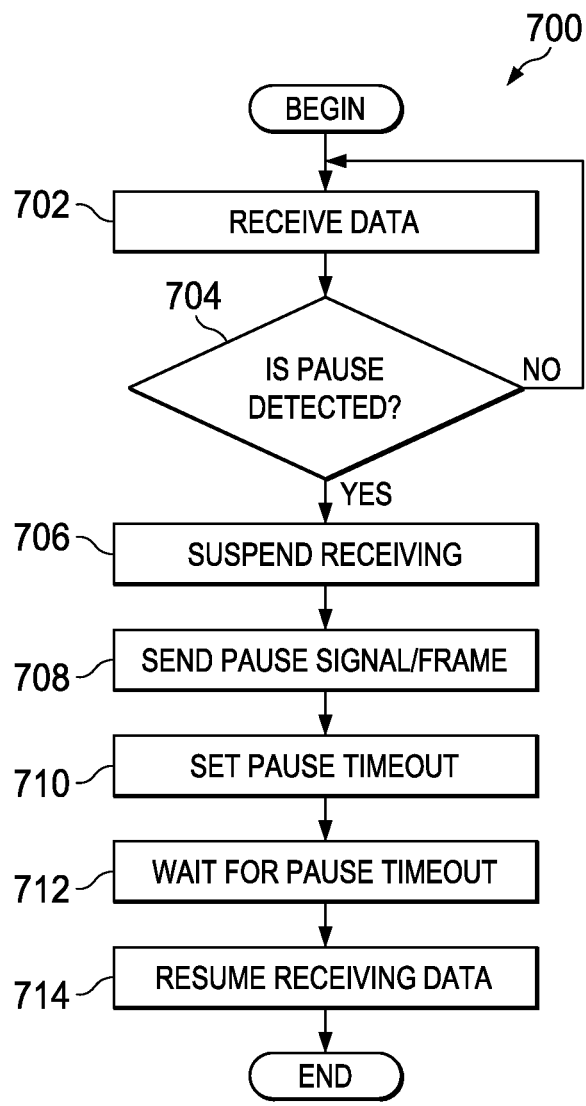
FIG. 7 is a flowchart illustrating an embodiment method executed by a receiver in response to receiving a pause frame or signal.

FIG. 7 is a flowchart illustrating an embodiment method 700 executed by a receiver in response to receiving a pause frame or signal. Method 700 begins at block 702 where the receiver receives data. At block 704, the receiver determines whether a pause is detected. The pause may be indicated to the receiver by any number of mechanisms. The mechanism that the receiver uses to detect a pause may depend on the insertion procedure executed by the transmitter. For example, the receiver may receive a control frame inserted between fragmented data transmissions, a set of bits inserted into the transmission which would not otherwise occur in the transmission, a PN PHY sequence, or a CRC appended to the end of a data fragment. IF the pause is a control frame inserted between fragmented transmissions, after receiving the each fragment, the receiver checks the frame header for control frame type. If the control frame type is the pause frame, the pause procedure comes into effect. If the pause is a sequence of bits, the receiver continuously scans (or otherwise monitor) the received transmission for the sequence. If, at block 704, no pause is detected, the method proceeds to block 702 where the receiver continues to receive data. If, at block 704, a pause is detected, the method proceeds to block 706 where the receiver suspends its PHY receiving and MAC layer receiving procedure. At block 708, the receiver sets a pause timeout period and at block 710, the receiver waits for the pause timeout and then proceeds to block 702 where the receiver continues to receive data. If the pause frame/signal is missed, the receiver continues its normal operation. The interrupted frame will be corrupted and the regular MAC layer ACK procedure may recover it later. If there is enough time, the receiver may perform another MAC layer procedure not related to the suspended transmission. At block 712, the receiver waits for the expiration of the PAUSE timeout period. After the expiration of the PAUSE timeout period, at block 714, the receiver resumes receiving data, after which, the method 700 may end.

Figure 8:
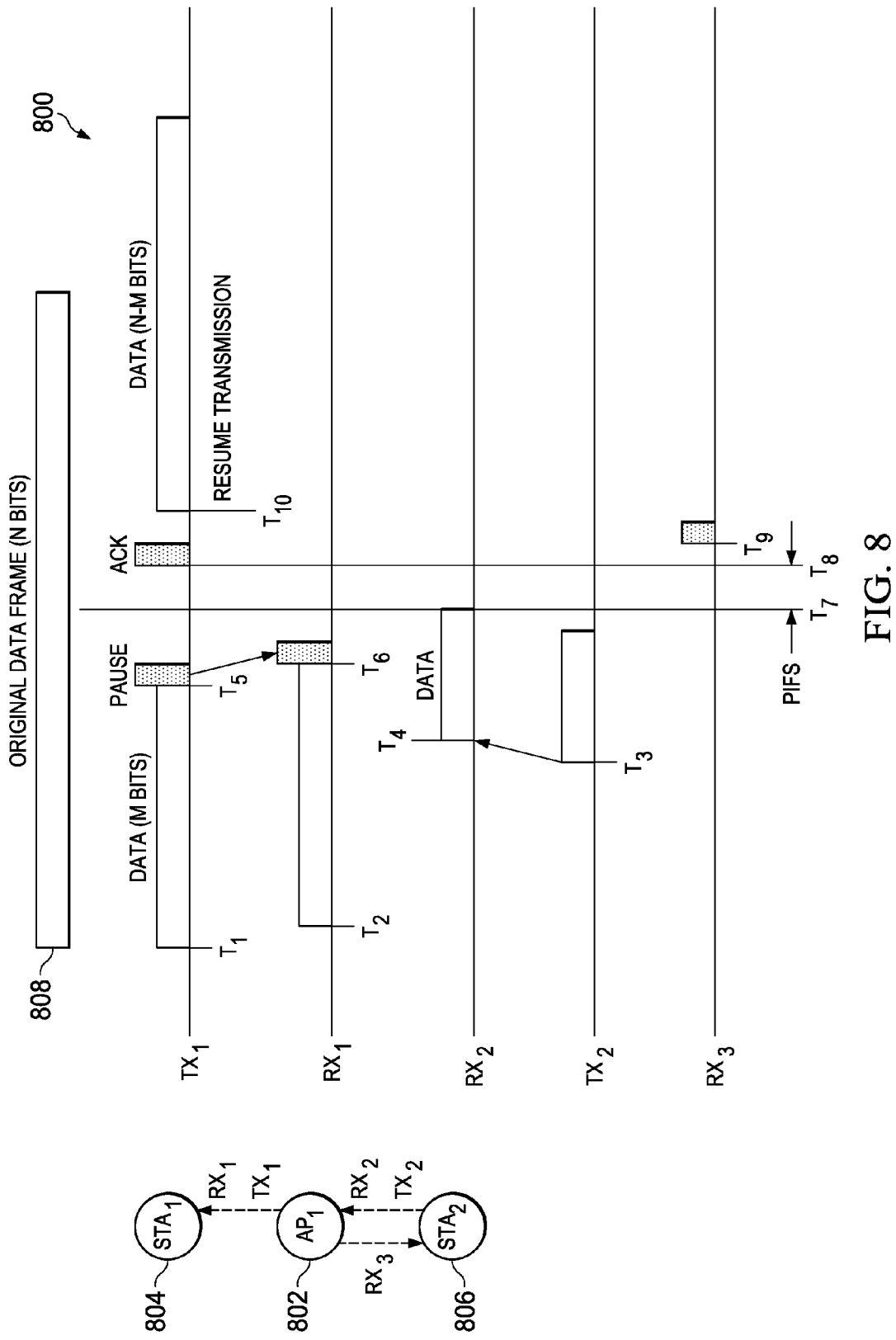
FIG. 8 is a block diagram of an embodiment system for pause frame enablement.

FIG. 8 is a block diagram of an embodiment system 800 for pause frame enablement. The system includes an AP1 802, a STA1 804, and a STA2 806. The AP1 802 is transmitting (TX1) an original data frame 808 to STA1 804 which receives the data frame at RX1. The original data frame 808 is n bits in size. AP1 802 is also receiving (RX2) data transmitted (TX2) from STA2 806 to which AP1 802 must send an ACK reply after the data from STA2 806 has been received. A timeline 810 for each of the transmissions and receptions TX1, RX1, RX2, TX2, and RX3 shows when data is transmitted and received by each of the AP1 802, STA1 804, and STA2 806.

The AP1 802 has full-duplex functionality. The deadlock problem posed is that the STA1 is receiving a long transmission from the AP1 802 and the AP receives a short transmission from the STA2 806 to which the AP1 802 should transmit an ACK back to within point coordination function (PFS) interframe space (PIFS) time after reception of the data from STA2 806 is completed. The pause frame/signal disclosed above resolves the deadlock.

At time T1, the AP1 begins transmitting the original data frame 808 to the STA1 804. At time T2, the STA1 804 begins receiving the data from the AP1 802. At time T3, the STA2 806 begins transmitting data to the AP1 802. At time T4, the STA1 804 begins receiving the data from the AP1 802. At time T3, the STA2 806 begins transmitting data to the AP1 802. At time T4, the AP1 802 begins receiving the data from STA2 806. The AP1 802 may calculate or otherwise determine when the data transmitted from the STA2 806 will be completely received and stop transmission to the STA1 804 with enough time to send an ACK message to the STA2 806. At time T5, the AP1 802 stops transmitting data to the STA1 804 and transmits a pause frame or signal to the STA1 804. A time T6, the STA1 804 receives the pause frame or signal from the AP1 802 and suspends its PHY receiving and MAC layer receiving procedure. At time T7, the AP1 802 finishes receiving the data from the STA2 806. At time T8, the AP1 802 transmits an ACK message to the STA2 806 which is received by the STA2 806 at time T9. At time T10, the AP1 802 resumes data transmission of the remaining data bits to STA1 804. The ACK message is transmitted by the AP1 802 within the PIFS time from the time T7 that the data transmission from the STA2 806 was completely received by the AP1 802.

Without the pause in data transmission to STA1 804, STA2 806 would have to wait until the entire original data frame 808 was transmitted to STA1 804 before STA2 806 could continue with other transmissions, thereby idling the channel on which the AP1 802 receives data for the entirety of the original data frame 808 transmission.

Figure 9:
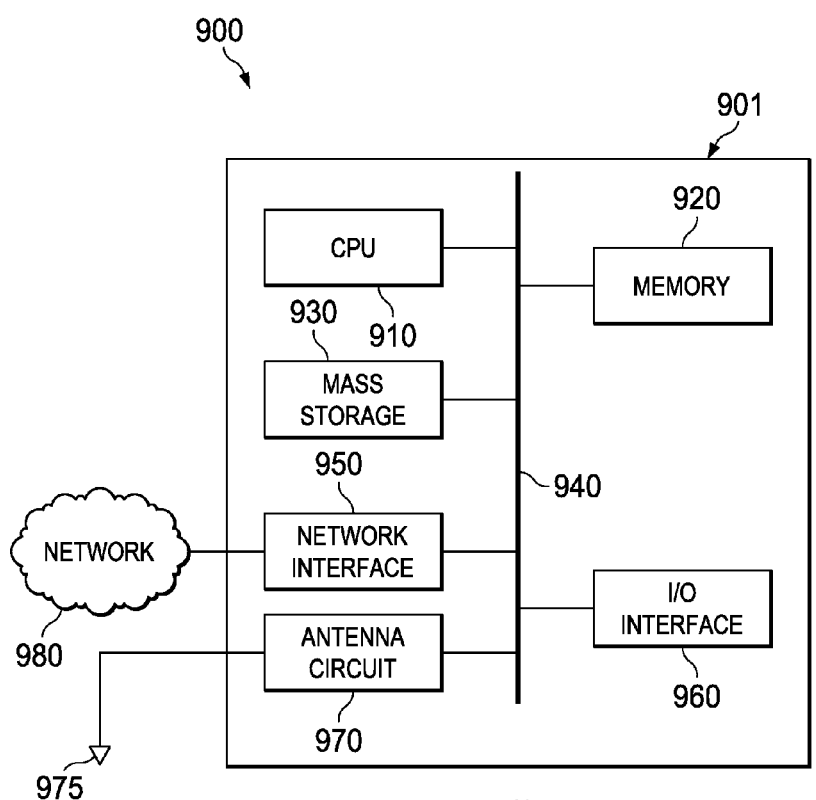
FIG. 9 illustrates a computing platform that may be used for implementing, for example, the devices and methods described herein, in accordance with an embodiment.

FIG. 9 is a block diagram of a processing system 900 that may be used for implementing the devices and methods disclosed herein. Specific devices may utilize all of the components shown, or only a subset of the components and levels of integration may vary from device to device. Furthermore, a device may contain multiple instances of a component, such as multiple processing units, processors, memories, transmitters, receivers, etc. The processing system 900 may comprise a processing unit 901 equipped with one or more input/output devices, such as a speaker, microphone, mouse, touchscreen, keypad, keyboard, printer, display, and the like. The processing unit 901 may include a central processing unit (CPU) 910, memory 920, a mass storage device 930, a network interface 950, an I/O interface 960, and an antenna circuit 970 connected to a bus 940. The processing unit 901 also includes an antenna element 975 connected to the antenna circuit.

The bus 940 may be one or more of any type of several bus architectures including a memory bus or memory controller, a peripheral bus, video bus, or the like. The CPU 910 may comprise any type of electronic data processor. The memory 920 may comprise any type of system memory such as static random access memory (SRAM), dynamic random access memory (DRAM), synchronous DRAM (SDRAM), read-only memory (ROM), a combination thereof, or the like. In an embodiment, the memory 920 may include ROM for use at boot-up, and DRAM for program and data storage for use while executing programs.

The mass storage device 930 may comprise any type of storage device configured to store data, programs, and other information and to make the data, programs, and other information accessible via the bus 940. The mass storage device 930 may comprise, for example, one or more of a solid state drive, hard disk drive, a magnetic disk drive, an optical disk drive, or the like.

The I/O interface 960 may provide interfaces to couple external input and output devices to the processing unit 901. The I/O interface 960 may include a video adapter. Examples of input and output devices may include a display coupled to the video adapter and a mouse/keyboard/printer coupled to the I/O interface. Other devices may be coupled to the processing unit 901 and additional or fewer interface cards may be utilized. For example, a serial interface such as Universal Serial Bus (USB) (not shown) may be used to provide an interface for a printer.

The antenna circuit 970 and antenna element 975 may allow the processing unit 901 to communicate with remote units via a network. In an embodiment, the antenna circuit 970 and antenna element 975 provide access to a wireless wide area network (WAN) and/or to a cellular network, such as Long Term Evolution (LTE), Code Division Multiple Access (CDMA), Wideband CDMA (WCDMA), and Global System for Mobile Communications (GSM) networks. In some embodiments, the antenna circuit 970 and antenna element 975 may also provide Bluetooth and/or WiFi connection to other devices.

The processing unit 901 may also include one or more network interfaces 950, which may comprise wired links, such as an Ethernet cable or the like, and/or wireless links to access nodes or different networks. The network interface 901 allows the processing unit 901 to communicate with remote units via the networks 980. For example, the network interface 950 may provide wireless communication via one or more transmitters/transmit antennas and one or more receivers/receive antennas. In an embodiment, the processing unit 901 is coupled to a local-area network or a wide-area network for data processing and communications with remote devices, such as other processing units, the Internet, remote storage facilities, or the like.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed is:

1. A method in a wirelessly enabled and full duplex enabled network component for pausing an ongoing data transmission, the method comprising:
   beginning a transmission, with the network component, of first data from the network component to a first station, wherein the network component and the first station are different devices;
   pausing, with the network component, the transmission of the first data from the network component to the first station;
   transmitting, with the network component, a pause indicator from the network component to the first station notifying the first station that transmission of the first data from the network component to the first station will be paused;
   transmitting, with the network component, the second data from the network component to the second station; and
   resuming the transmission, with the network component, of the first data from the network component to the first station,
   wherein transmitting, with the network component, a pause indicator to the first station notifying the first station that transmission of the first data will be paused comprises appending a cyclic redundancy check (CRC) to the end of one of the data fragments in the plurality of first data fragments.

2. The method of claim 1, wherein determining that transmission of the second data to the second station is required comprises receiving third data from the second station, wherein an acknowledgement message is required to be sent to the second station after the third data is received.

3. The method of claim 2, wherein the acknowledgement message is required to be sent within a pre-specified time period.

4. The method of claim 2, wherein the pause indicator is transmitted to the first station before all of the third data has been received.

5. The method of claim 1, wherein the second data is smaller than the first data.

6. The method of claim 1, wherein the pause indicator comprises a pause control frame.

7. The method of claim 6, wherein the pause control frame comprises an indication of a duration of the pause in the first data transmission.

8. The method of claim 1, wherein the pause indicator comprises a set of bits inserted in the first data transmission that would not otherwise occur in the first data transmission.

9. The method of claim 1, wherein the pause indicator comprises a pseudo-noise (PN) physical layer (PHY) sequence transmitted over the ongoing transmission.

10. The method of claim 1, further comprising inserting a sequence of bits in the first data transmission to notify the first station that a control frame is coming instead of additional data bits, wherein the control frame comprises the pause indicator.

11. The method of claim 1, wherein the transmission of the first data to the first station comprises segmenting the first data into a plurality of first data fragments.

12. The method of claim 11, wherein each data fragment in the plurality of first data fragments comprises a forward error correction (FEC) code.

13. A wirelessly enabled and full duplex enabled network component for pausing an ongoing data transmission, the network component comprising:
   a processor; and
   a non-transitory computer readable storage medium storing programming for execution by the processor, the programming including instructions to:
   begin a transmission of first data from the network component to a first station, wherein the network component and the first station are different devices;
   pause the transmission of the first data from the network component to the first station;
   transmit a pause indicator from the network component to the first station notifying the first station that transmission of the first data from the network component to the first station will be paused;
   transmit the second data from the network component to the second station; and
   resuming the transmission, with the network component, of the first data from the network component to the first station,
   wherein transmitting a pause indicator to the first station notifying the first station that transmission of the first data will be paused comprises appending a cyclic redundancy check (CRC) to the end of one of the data fragments in the plurality of first data fragments.

14. The network component of claim 13, wherein instructions to determine that transmission of the second data to the second station is required comprises instructions to receive third data from the second station, wherein an acknowledgement message is required to be sent to the second station after the third data is received.

15. The network component of claim 14, wherein the acknowledgement message is required to be sent within a pre-specified time period.

16. The network component of claim 14, wherein the pause indicator is transmitted to the first station before all of the third data has been received.

17. The network component of claim 13, wherein the second data is smaller than the first data.

18. The network component of claim 13, wherein the pause indicator comprises a pause control frame.

19. The network component of claim 18, wherein the pause control frame comprises an indication of a duration of the pause in the first data transmission.

20. The network component of claim 13, wherein the pause indicator comprises a set of bits inserted in the first data transmission that would not otherwise occur in the first data transmission.

21. The network component of claim 13, wherein the pause indicator comprises a pseudo-noise (PN) physical layer (PHY) sequence transmitted over the ongoing transmission.

22. The network component of claim 13, wherein the programming further comprises instructions to insert a sequence of bits in the first data transmission to notify the first station that a control frame is coming instead of additional data bits, wherein the control frame comprises the pause indicator.

23. The network component of claim 13, wherein the instructions to begin transmission of the first data comprises instructions to segment the first data into a plurality of first data fragments.

24. The network component of claim 23, wherein each data fragment in the plurality of first data fragments comprises a forward error correction (FEC) code.

25. A method in a wirelessly enabled network component for pausing reception of data, the method comprising:
receiving, at a first network component, data from a second network component, the data comprising a plurality of data fragments;
receiving a pause indicator from the second network component, wherein the pause indicator notifies the first network component that data reception from the second network component will be suspended, wherein the first network component is different from the second network component;
suspending, with the first network component, a media access control (MAC) layer receiving procedure;
setting, with the first network component, a pause timeout period; and
resuming, with the first network component, the MAC layer receiving procedure upon an expiration of the pause timeout period,
wherein receiving the pause indicator comprises receiving a cyclic redundancy check (CRC) appended to the end of one of the data fragments in the plurality of data fragments.

26. The method of claim 25, wherein the pause indicator comprises a control frame inserted between fragmented data transmissions.

27. The method of claim 25, wherein the pause indicator indicates a duration of the pause timeout period.

28. The method of claim 25, wherein the receiving a pause indicator comprises monitoring, by the first network component, the data for a set of bits that are not expected in the data.

29. The method of claim 25, wherein the data comprises a plurality of frames and wherein the receiving a pause indicator comprises monitoring received frames to determine if a frame type of the received frame is a pause frame.

30. The method of claim 25, further comprising performing another MAC layer procedure during the pause timeout period.

31. A wirelessly enabled network component configured to pause an ongoing data reception, the network component comprising:
a processor; and
a non-transitory computer readable storage medium storing programming for execution by the processor, the programming including instructions to:
receive data from a wireless station, the data comprising a plurality of data fragments;
receive a pause indicator from the wireless station, wherein the pause indicator notifies the network component that data reception from the wireless station will be suspended, wherein the wireless station and the network component are different devices;
suspend a media access control (MAC) layer receiving procedure;
set a pause timeout period; and
resume the MAC layer receiving procedure upon an expiration of the pause timeout period,
wherein receiving the pause indicator comprises receiving a cyclic redundancy check (CRC) appended to the end of one of the data fragments in the plurality of data fragments.

32. The network component of claim 31, wherein the pause indicator comprises a control frame inserted between fragmented data transmissions.

33. The network component of claim 31, wherein the pause indicator indicates a duration of the pause timeout period.

34. The network component of claim 31, wherein the instructions to receive a pause indicator comprises instructions to monitor the data for a set of bits that are not expected in the data.

35. The network component of claim 31, wherein the data comprises a plurality of frames and wherein the instructions to receive a pause indicator comprise instructions to monitor received frames to determine if a frame type of the received frame is a pause frame.

36. The network component of claim 31, wherein the programming further comprises instructions to perform another MAC layer procedure during the pause timeout period.

\* \* \* \* \*